Nov. 25, 1930.  E. J. BUDLONG  1,783,071
SPREADER
Filed May 29, 1928
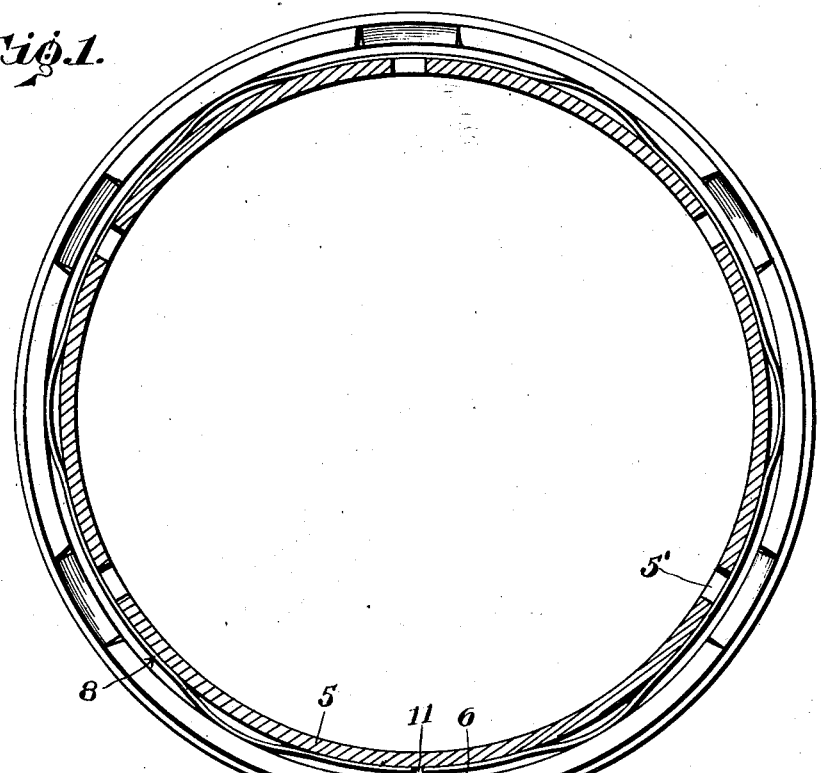
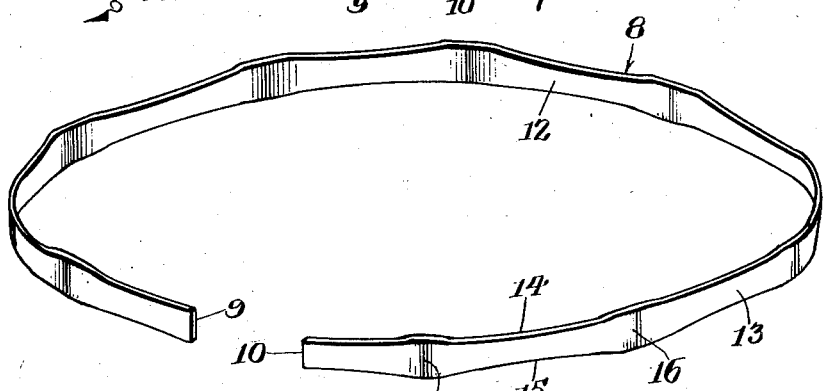
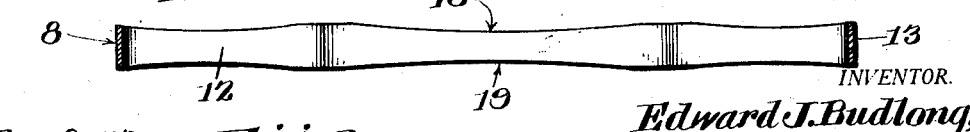
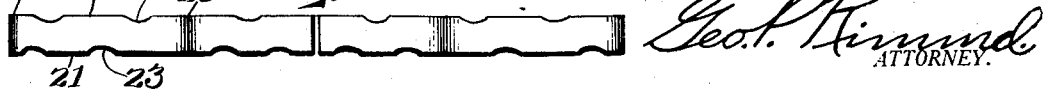
INVENTOR.
Edward J. Budlong,
BY
Geo. P. Kimmel
ATTORNEY.

Patented Nov. 25, 1930

1,783,071

UNITED STATES PATENT OFFICE

EDWARD J. BUDLONG, OF HANFORD, CALIFORNIA, ASSIGNOR TO BUDLONG & FUNCHESS MOTOR PRODUCTS CO., OF HANFORD, CALIFORNIA

SPREADER

Application filed May 29, 1928. Serial No. 281,435.

This invention relates to spreaders designed primarily for use in connection with oil accumulating piston rings for an internal combustion engine, but it is to be understood that a spreader in accordance with this invention may be employed for any purpose wherein it is found applicable, and the invention has for its object to provide in a manner as hereinafter set forth for compensating for the wear between the cylinder wall and the piston ring.

Another object of the invention is to provide in a manner as hereinafter set forth a spreader which is adapted to insure a tight fit between the cylinder wall and piston ring to prevent pumping the lubricant into the combustion chamber of an engine.

A further object of the invention is to provide in a manner as hereinafter set forth a spreader adapted to permit the free passage of lubricant or oil from the piston ring groove to the interior of the piston.

Further objects of the invention are to provide in a manner as hereinafter set forth a spreader which is simple in its structure and arrangement, thoroughly efficient for its intended purpose, strong, durable, inexpensive to manufacture and easily installed in its operative position.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications may be resorted to which fall within the scope of the invention as claimed.

In the drawings wherein like reference characters denote corresponding parts throughout the several views:

Figure 1 is a sectional plan of a piston showing the adaptation with an oil accumulating piston ring, of a spreader in accordance with this invention.

Figure 2 is a perspective view of a spreader in accordance with this invention.

Figure 3 is a fragmentary view in side elevation of the spreader.

Figure 4 is a side elevation of a modified form of the spreader in accordance with this invention.

Referring to the drawings, 5 denotes a piston having circumferentially spaced openings 5' extending through its walls and communicating with a piston ring groove 6 which extends around the periphery of the piston. A piston ring section 7, of the type set forth in my pending application, Serial No. 281,434, filed May 29, 1928, is mounted in the groove 6. Interposed between the piston ring section 7 and the piston 5 and seated transversely within the groove 6, is a spreader in accordance with this invention, designated generally at 8.

The spreader 8 is formed of a flat strip of resilient metallic material of a width sufficient to permit it to be inserted in the groove 8 and of rectangular cross section at any point throughout thereof. The thickness of the metal may be as desired considering the chemical and physical properties of the metallic material and the pressure to be derived therefrom. The length of the strip will vary according to the diameter of the piston, but it is desirable to have the ends 9 and 10 spaced from each other as at 11, when constructed in accordance with this invention and seated within the piston ring groove.

The strip of metallic material is formed into a polygonal shaped band which is split transversely to form the free ends 9 and 10. Each of the sides of the polygonal band have inner and outer faces 12 and 13 respectively, top and bottom edges 14 and 15 respectively and adjacent corners 16 and 17. From the adjacent corners 16 and 17 the opposed edges 14 and 15 curve gradually inwardly in opposite directions, thereby forming a plurality of elongated, shallow, concavities designated generally at 18 and 19 on the opposite edges of the band, which extend from corner to corner about the polygonal shaped split band.

In the modification shown in Figure 4 of the drawing, the contour of the split band is the same as heretofore described. The modification differs from the foregoing inasmuch as the opposite edges 20 and 21 are straight and parallel to each other. Between the adjacent corners 24 and 25 about the polygonal split band the opposite edges 20 and 21 are provided with a plurality of spaced, curved, notches 22 and 23.

In assembling the spreader it is interposed in the groove 6 between the inner end of the piston ring and the inner end of the groove. The spreader seats transversely of the groove having its opposite edges abutting the top and bottom walls of the groove. The inner faces 12 are positioned next to the inner end of the piston ring, and the outer faces 13 are positioned next to the piston wall at the inner end of the groove. When the piston ring is in abutting relation to the cylinder wall, the ring will press on the spreader and tend to curve the corners of the polygon. The face of the polygon will flex radially in either direction, but the resistance of the corners of the spreader to curvature sets up a reactive force which presses the piston ring outwardly and not only compensates for wear between the cylinder wall and piston ring, but will also insure a tight joint therebetween to prevent pumping oil into the combustion chamber of the engine. The spreader has a maximum of linear resiliency, when the corners of the polygonal shaped band are free, and it may be expanded or compressed for insertion within the groove with comparative ease. The excess oil or lubricant is conducted through the passages in the piston ring and into the space occupied by the spreader. The concavities 18, 19 or the curved notches 22, 23 provide clearances between the body of the spreader and the upper and lower groove walls to permit the continuous flow of the excess oil or lubricant into the openings 5' of the piston and back into the crank case not shown in the drawings.

What I claim is:—

1. A spreader comprising a split band, said band provided with a plurality of circumferentially spaced portions resistant to curvature and further provided with portions intermediate said resistant portions adapted to flexibility and said band further having each of the edges of each of the portions between said resistant portions formed with clearances for the passage of a lubricant.

2. A spreader comprising a split band of rectangular cross section at any point throughout thereof, said band provided with a plurality of circumferentially spaced portions resistant to curvature, further provided with portions intermediate said resistant portions adapted to flexibility, and said band further having each of its longitudinal edges between said resistant portions concaved to provide clearances for the passage of a lubricant.

In testimony whereof, I affix my signature hereto.

EDWARD J. BUDLONG.